Dec. 3, 1968     R. R. HELLMAN     3,414,232
GIMBAL VALVE
Filed Aug. 8, 1966
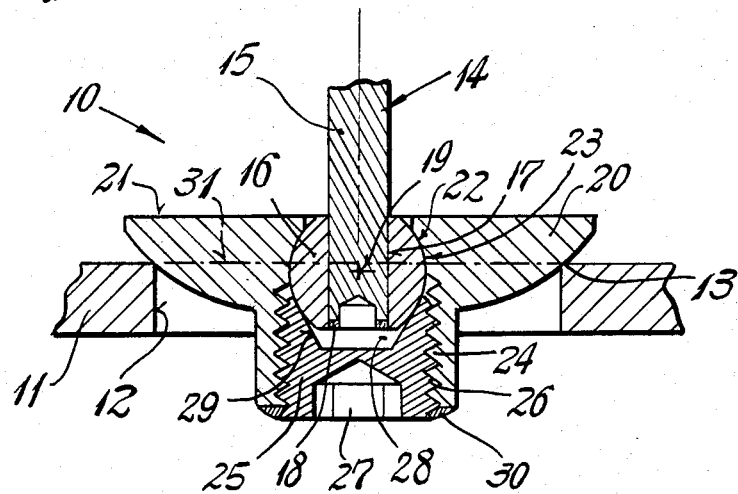
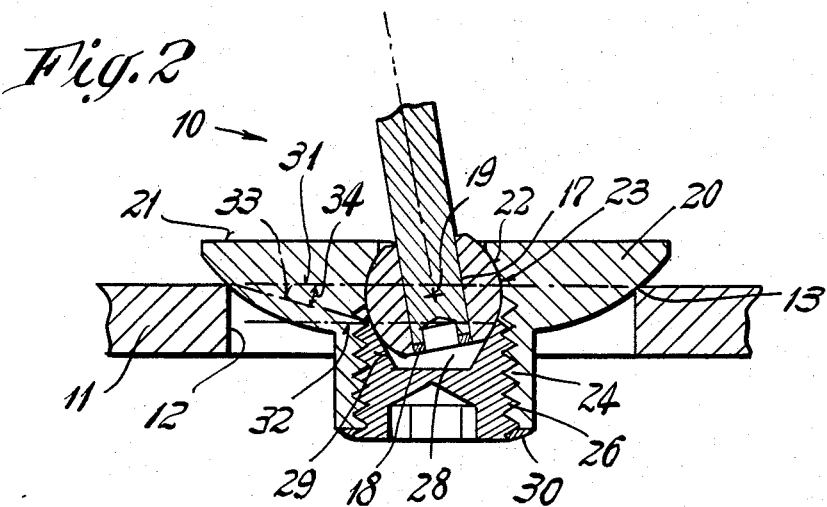
INVENTOR.
Robert R. Hellman
BY
Johnson and Kline
ATTORNEYS

United States Patent Office 3,414,232
Patented Dec. 3, 1968

3,414,232
GIMBAL VALVE
Robert R. Hellman, Bridgeport, Conn., assignor to Westport Development & Manufacturing Company, Inc., Milford, Conn., a corporation of Connecticut
Filed Aug. 8, 1966, Ser. No. 570,915
7 Claims. (Cl. 251—86)

The present invention relates to a valve for cooperating with a valve seat to regulate closure of an opening and more particularly to a valve which is capable of a leak-proof closure even with misalignment between it and the valve seat.

A particular type of valve structure in which the present invention has special utility is the kind having a stationary valve seat that surrounds an opening. A stopper is supported for linear movement with respect to the seat and at one maximum position of movement, the opening is closed by the stopper abutting the valve seat. Movement of the stopper away from the valve seat towards its other maximum position progressively increases the gap between the stopper and the valve seat to regulate the effective size of the opening.

In such a valve it has, heretofore, been difficult to provide a positive seal as the stopper must abut the seat in a continuous seal line. If there is misalignment therebetween, then an assured sealing of the opening will not generally occur. While it has been suggested to use resilient means to accommodate the misalignment, such valves have not been found completely satisfactory in achieving an assured seal under ranges of temperature and pressure, achieving a sensitive regulation of the valve opening and being durable in use.

It is, accordingly, an object of the present invention to provide a valve which will cooperate with a valve seat to provide a closure of an opening for an extended period of use even with misalignment existing between the parts and over wide ranges of temperature and pressure.

Another object of the present invention is to provide a valve which achieves the above object and which is composed of few parts, is extremely simple in construction and does not rely upon resilient or deformable parts.

A further object of the present invention is to provide a valve which is capable of universal movement about its actuator yet the force to effect universal movement may be preselected and maintained.

In carrying out the present invention, the valve is utilized as the stopper for an opening with the opening being surrounded by a valve seat. The stopper is mounted for movement on the end of an actuator to move therewith toward and away from the valve seat. In addition, the stopper is mounted for universal movement on the end of the actuator and thus is capable of pivoting on its axis with respect to the axis of movement of the actuator with both axes having a common center. The stopper has sides which are dimensioned to engage the valve seat and the line of engagement or seal between them is located on a plane which is on the side of the common center away from the end of the actuator.

The stopper further includes a plug and the plug is shaped and positioned to continuously abut the actuator along a line which lies in a plane located on the side of the actuator nearer the end. Thus the force of the actuator is transmitted to the plug on one side of the common center while the engagement of the stopper with the valve seat occurs on the other side of the center. By such a relationship, the force of the actuator on the stopper is beyond the engagement of the stopper and valve seat and thus the stopper may move relative to the actuator to overcome misalignment with a minimum of opposition created by the actuator force.

In order to preselect the force required to produce movement of the stopper relative to the actuator, the stopper and plug are secured on the actuator in a manner which enables the frictional force therebetween to be adjusted and then secured at the adjusted value. Thus the stopper does not move with respect to the actuator unless a greater force than the preselected force is applied thereto.

Other features and advantages will hereinafter appear.

In the drawing:

FIGURE 1 is an axial section of the gimbal valve of the present invention shown engaging a valve seat to close an opening.

FIG. 2 is a view similar to FIG. 1 with the valve being closed even though substantially misalignment exists.

Referring to the drawing, the valve is generally indicated by the reference numeral 10 and is shown cooperating with a plate 11 having a circular opening 12. While a cooperating valve seat may have any desired configuration such as annular, frusto-conical, semispherical, etc., in the instant embodiment, the valve seat 13 consists of an angular corner which provides a line contact with the valve to close the opening 12 against passage of fluid therethrough.

The valve 10 includes an actuator 14 which, while it may be made integral, in the embodiment shown consists of a rod 15 and a segment of a spherical ball 16, the ball 16 preferably being formed from a hardened metal ball by drilling a bore 17 through its axis. The rod 15 is inserted into the bore 17 and welding as at 18 secures the ball segment to the end portion of the rod 15. It will thus be appreciated that the end portion of the actuator 14 is provided with surfaces which constitute segments of a sphere with the center of the segments being at a point 19 which also lies on the longitudinal axis of the rod 15.

A stopper 20 having a base 21 is positioned on the end of the actuator 14. The stopper is provided with a bore 22 that has a portion of its inner surfaces 23 formed as segments of a hemisphere having the point 19 as a center. With such a construction it will be appreciated that the stopper 20 when secured on the actuator may universally move or gimbal about the point 19 on the actuator.

The remaining portion of the bore 22 of the stopper 20 is formed with threads 24 which threadingly receive a plug 25. The plug 25 is exteriorly threaded as at 26 and is formed with a hexagonal recess 27 to enable the turning thereof by a wrench, though of course if desired, a screw driver slot, a hexagonal head, etc. may be utilized in place thereof. The other end of the plug 25 has a recess 28 formed with diverging sides 29 which in the instant embodiment are preferably frusto-conical though if desired may be segments of a hemisphere with the center of the sides and plug being aligned with the longitudinal axis of the actuator 14.

In the constructing of the valve, the stopper may be initially positioned on the actuator and the segment of the ball 16 then welded to the rod 15 or conversely the stopper may be positioned onto the actuator with a downward movement after the segment of ball 16 has been secured as by the welding 18 to the rod 15. The plug 25 is then threadingly inserted into the bore 22 and a rotative movement applied thereto to axially advance it with respect to the stopper until the diverging sides engage the segments of the ball 16. Further rotation of the plug 25 applies an increasing force against the segment of the ball 16 and by controlling the rotative force, the pressure on the segment of the ball caused by engagement of the inner surface 23 and the diverging sides 29 may thus be set to a selected value. By such a construction, it will be understood that the larger the force, the larger will be the frictional force opposing movement of the stopper on the actuator and hence the valve of the present invention enables the preload pressure or force required to effect movement of the stopper on the actuator to be accordingly preselected. Welding as at 30 secures the plug to the stopper and in addition is positioned to seal the joint between the threads thereby preventing leakage between the plug and the stopper. By the present construction, the welding 30 is located relatively far from the segments of the ball 16 and hence will not effect the initial setting of the preload.

In the position of the valve shown in FIG. 1 it will be clear that the valve engages seat 13 in a circle lying in a plane, generally indicated by the reference numeral 31 with the circle forming the seal line therebetween. Moreover, the diverging sides 29 of the plug engage the stopper in a circle lying in the plane, generally indicated by the reference numeral 32 with the circle forming the pressure or force line therebetween. In accordance with the present invention, the plane 31 is spaced on the other side of the point 19 then the plane 32, with the latter being positioned nearer the end of the actuator.

By such a relationship when misalignment exists (as shown in FIG. 2) between the valve seat and the stopper, a portion of the stopper will initially engage the valve seat as the actuator moves it to the closed position. The engagement will then exert a force on the stopper causing it to universally move about the point 19 until the stopper engages the valve seat throughout. As the actuator moves the stopper to the fully closed position, it exerts its force on the other side of the point 19 about which the stopper pivots and thus has a component which aids the stopper in universally moving.

When the actuator is moved from its closed position to its open position, the stopper is prevented by forces, such as fluid pressure, vibration, etc. from moving on the actuator by the preload produced by the plug 25 and thus will not move relative to the actuator.

It has been found that the distance from the point 19 along the axis of the actuator to the plane 31 and the plane 32 bears a relationship to the misalignment which the valve can effectively accommodate. An angle of between 10° and 45° should exist between a point on the seal line circle in the plane 31 and the nearest point in the pressure line circle in the plane 32. In the drawing, the dotted straight line 33 is drawn between two such points and the angle is indicated by the reference character 34.

It will accordingly be appreciated that there has been disclosed a valve for use with a valve seat to close an opening. The valve is capable of adjusting to misalignment between its direction of movement and the valve seat by having a stopper being mounted for universal movement. During closing, the stopper engages the valve seat and the latter forces the stopper to assume a position that is in alignment with it. The actuator aids in the movement of the stopper by the force of the actuator being applied to the stopper ahead of the center of universal movement of the stopper while the stopper engages the valve seat behind the center.

Variations and modifications may be made within the scope of the claims and portions of the improvements may be used without others.

I claim:
1. A gimbal valve for cooperation with a valve seat defining an opening to regulate closure of the opening comprising an elongate actuator having at least the side surfaces of an end portion formed to constitute segments of a sphere having a center, a stopper having a base and sealing sides extending from said base, said stopper being formed with a bore that has a portion having side constituting segments of a hemisphere having a center within the bore and adjacent the base of the stopper and another portion adjacent the other end of the stopper, and a plug positioned in the another portion of said bore and having a recess formed with diverging sides, said stopper being positioned on said actuator to have both centers coincide, said sealing sides of the stopper being dimensioned with respect to the valve seat to engage said valve seat in a first plane lying between the base of the stopper and the common center and said diverging sides of said plug being dimensioned to engage the spherical surfaces of the actuator in a second plane on the other side of the common center.

2. The invention as defined in claim 1 in which the two planes are parallel and the axis of the actuator is pivotal with respect thereto about the common center.

3. The invention as defined in claim 1 in which the angle between a point of contact lying in the first plane and the nearest point of contact of a point lying in the second plane is not less than 10° and not greater than 45°.

4. The invention as defined in claim 1 in which there are means for moving the plug axially in the bore to set the force of the plug against the actuator and means for retaining said plug as set.

5. The invention as defined in claim 4 in which the retaining means seals the threaded joint between the plug and the stopper to prevent leakage therethrough.

6. The invention as defined in claim 1 in which the another portion of the bore is threaded and the plug has threads and is threadingly secured in said bore.

7. The invention as defined in claim 1 in which the actuator includes an elongate rod and a substantially spherical ball having a bore, said ball being secured on the end portion of the rod by the rod being positioned in the ball bore, and in which the surface of the ball forms the segments of the sphere.

References Cited

UNITED STATES PATENTS

| 1,604,529 | 10/1926 | Meyrowitz | 251—86 |
| 3,174,717 | 3/1965 | Bray | 251—86 X |
| 3,213,879 | 10/1965 | Thompson | 251—86 X |

FOREIGN PATENTS

| 497,629 | 9/1919 | France. |
| 848,682 | 9/1960 | Great Britain. |

M. CARY NELSON, *Primary Examiner.*

ROBERT C. MILLER, *Assistant Examiner.*